United States Patent
Dinter et al.

(10) Patent No.: US 8,591,368 B2
(45) Date of Patent: Nov. 26, 2013

(54) DRIVE SYSTEM FOR A WIND TURBINE

(75) Inventors: Ralf Martin Dinter, Gelsenkirchen (DE); Arno Klein-Hitpass, Aachen (DE); Jan-Dirk Reimers, Aachen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/537,651

(22) Filed: Jun. 29, 2012

(65) Prior Publication Data

US 2013/0165288 A1    Jun. 27, 2013

(30) Foreign Application Priority Data

Jun. 30, 2011 (EP) .................................. 11172108

(51) Int. Cl.
*F16H 48/06* (2006.01)
*H02P 9/04* (2006.01)
*F03D 9/00* (2006.01)
*F02B 63/04* (2006.01)
*H02K 7/10* (2006.01)
*H02K 7/18* (2006.01)

(52) U.S. Cl.
USPC ........... 475/149; 475/154; 416/170 R; 290/55

(58) Field of Classification Search
USPC .......... 475/149, 154; 416/170 R; 290/1 C, 55
See application file for complete search history.

(56) References Cited

U.S. PATENT DOCUMENTS

| | | | |
|---|---|---|---|
| 5,663,600 A * | 9/1997 | Baek et al. ...................... | 290/55 |
| 8,128,525 B2 | 3/2012 | Dinter et al. | |
| 8,376,708 B2 * | 2/2013 | Patel et al. ................ | 416/169 R |
| 8,393,989 B2 * | 3/2013 | Pohl .............................. | 475/196 |
| 2010/0062888 A1 | 3/2010 | Ciszak | |
| 2011/0068583 A1 | 3/2011 | Burkart | |
| 2012/0067138 A1 | 3/2012 | Klein-Hitpass et al. | |
| 2012/0108380 A1 | 5/2012 | Dinter et al. | |
| 2012/0125150 A1 | 5/2012 | Dinter et al. | |

FOREIGN PATENT DOCUMENTS

| | | |
|---|---|---|
| DE | 10318945 B3 | 10/2004 |
| DE | 102004022299 A1 | 12/2005 |
| EP | 1045139 A2 | 10/2000 |
| EP | 2931273 A2 | 3/2009 |
| EP | 2295147 A1 | 3/2011 |
| EP | 10003558.3 | 10/2011 |
| JP | 8312522 A | 11/1996 |
| WO | WO 2008031694 A1 | 3/2008 |

* cited by examiner

*Primary Examiner* — Tisha Lewis
(74) *Attorney, Agent, or Firm* — Henry M. Feiereisen LLC

(57) ABSTRACT

A drive system has a gear unit with planetary gear stage with a planetary gear carrier. A first shaft associated with the gear unit has a coupling flange connectable to the shaft of a working machine or a rotor and is supported by the planetary gear carrier. The gear unit and a motor/generator unit connected to a second shaft of the gear unit are enclosed by a gearbox. The motor/generator unit additionally includes a rotor connected to a hollow rotor shaft with a rotation lock. An electrically isolating, detachable flange connection is disposed between the rotor shaft and the second shaft, with the gear-side end of the detachable flange connection connected to a hollow gear shaft. A gearbox stub which concentrically encloses a gear-side end section of the gear shaft is disposed between gear unit and motor or generator unit and forms a bearing seat for the second shaft.

36 Claims, 5 Drawing Sheets

DRIVE SYSTEM FOR A WIND TURBINE

CROSS-REFERENCES TO RELATED APPLICATIONS

This application claims the priority of European Patent Application, Application Serial No. EP11172108, filed Jun. 30, 2011, pursuant to 35 U.S.C. 119(a)-(d), the content of which is incorporated herein by reference in its entirety as if fully set forth herein.

BACKGROUND OF THE INVENTION

The present invention relates to a drive system for a wind turbine.

A heavy-duty drive train for wind turbines or mills usually includes system components such as grid connection elements, motors or generators, couplings/clutches, gearboxes and drive shafts. In many cases converters are provided on the grid side. Brakes are often provided in the form of mechanical brakes on the high-speed shaft between gearbox and motor or generator, as braking torques are smaller there due to the gear ratio.

It would therefore be desirable and advantageous to provide a drive system for a wind turbine that is compact and easy to maintain.

SUMMARY OF THE INVENTION

According to one aspect of the present invention, a drive system according to the invention has a gear unit which includes at least one planetary gear stage with a ring gear, a plurality of planetary gears, a planetary gear carrier and a sun gear. In addition, a first shaft associated with the gear unit has a coupling flange which can be connected to a working machine or rotor shaft and is supported via the planetary gear carrier. The gear unit and a motor-unit or generator unit connected to a second shaft of the gear unit are housed in a gearbox housing. The motor or generator unit additionally includes a rotor connected to a hollow rotor shaft with a rotation lock.

According to an advantageous feature of the present invention, an electrically isolating, detachable flange connection may be disposed between the hollow rotor shaft and the second shaft of the gear unit, with the gear-side end of the flange connection being connected to a hollow gear shaft. A motor-side or generator-side end section of the second shaft of the gear unit may be concentrically enclosed by the hollow gear shaft and connected thereto via a coupling or clamping connection disposed inside the hollow gear shaft. A gearbox stub, which concentrically encloses a gear-side end section of the hollow gear shaft and constitutes a bearing seat for a bearing arrangement associated with the second shaft of the gear unit, is disposed between the gear unit and motor unit or generator unit. The hollow rotor shaft is also supported by this bearing arrangement. As a result, the drive system according to the invention has a very compact design. In particular, the detachable flange connection between the second shaft of the gear unit and the hollow rotor shaft also facilitates easy assembly of a generator/motor gear unit. In addition, with the drive system according to the invention, a motor-side or generator-side planetary gear carrier bearing may be installed on the generator side or the motor side.

According to another advantageous feature of the present invention, the hollow rotor shaft and the second shaft of the gear unit may essentially be supported on the gearbox stub solely by the bearing arrangement, thereby providing a particularly compact design that can be easily serviced.

According to another advantageous feature of the present invention, the hollow gear shaft may be connected to the second shaft of the gear unit, for example, by a geared coupling with short or curved toothing. Alternatively, the hollow gear shaft may be connected to the second shaft of the gear unit by an inner clamping set. The inner clamping set may include, for example, at least one outer ring and one inner ring which have mutually corresponding conical contact surfaces and can be tensioned against one another by means of a plurality of axially extending clamping bolts. According to another advantageous feature of the present invention, both the second shaft of the gear unit and the hollow gear shaft, and the hollow gear shaft and a socket flange, which is detachably connected to a rotor-side end of the flange connection, can be interconnected by tensioning the at least one outer ring and the at least one inner ring, thereby facilitating assembly. As an alternative to a geared coupling or an inner clamping set, the hollow gear shaft may be connected to the second shaft of the gear unit by an outer clamping set.

According to another advantageous feature of the present invention, essentially half of the second shaft of the gear unit may be enclosed axially by the hollow gear shaft. The bearing arrangement of the hollow gear shaft can then be disposed axially between the coupling or clamping connection and a sun gear non-rotatably connected to the second shaft of the gear unit, thereby enabling the bearing arrangement to be decoupled from constraining forces acting on the second shaft of the gear unit.

According to another advantageous feature of the present invention, the bearing arrangement of the hollow gear shaft on the gearbox stub includes a double-row bearing in an X-configuration, thereby enabling the hollow gear shaft to be manufactured without a shaft nut, because the hollow gear shaft is not required for adjusting the bearing clearance. Instead, an external bearing cover may be used for this purpose.

The gearbox stub is preferably integrally molded on an intermediate housing flange between gear unit and motor or generator unit. The intermediate housing flange can have a bearing seat for a motor-side or generator-side planetary gear carrier bearing. In addition, in particular a stator casing of the motor or generator unit and a ring gear of a motor-side or generator-side planetary gear stage may be mounted on an intermediate housing flange. Moreover, the intermediate housing flange may have flange extensions on which the stator casing and the ring gear of the motor- or generator-side planetary gear stage respectively are mounted. The diameters of both flange extensions are advantageously graduated such that they are of a comparable order of magnitude, the flange extension for the stator casing being the larger of the two. In a weight-optimized design, the flange extension for the ring gear of the motor-side or generator-side planetary gear stage may be internally aligned and bolted to the intermediate housing flange. According to another advantageous feature of the present invention, the flange extension associated with the stator casing and the flange extension associated with the ring gear are spaced apart from one another in the axial direction.

According to a particularly preferred development of the present invention, the coupling flange is flexibly connectable to the shaft of the working machine or the rotor, thereby allowing cardanic coupling of the shaft of the working machine or the rotor, in particular with an angular offset. Such a coupling can be implemented, for example, with flexible bolts. In addition, the gearbox housing may advantageously also have a circumferentially symmetrical or partially symmetrical cardanic suspension for connection to a structural support element of the wind turbine. The structural support element may be, for example, a base bearing linked to a wind turbine frame or nacelle. With a double or full cardanic suspension of the drive system within the structural support elements and cardanic connection of the coupling flange, bearing- or gear-tooth-damaging effects can be prevented. Displacements in base supports caused by main frame deformations of a wind turbine which according to previous solutions are coupled into a drive train via a suspension of the drive train do then not cause undesirable constraining forces, because they are eliminated with the cardanic suspension. The drive system is therefore merely subjected to torsional loads.

When the drive system according to the invention is used in a wind turbine, the gear unit is connected to a generator unit. In addition, the first shaft of the gear unit is in this case a gear-side driving shaft. The second shaft of the generator unit, on the other hand, is a gear-side driven shaft. When the drive system according to the invention is used in a wind turbine, the coupling flange of the gear-side drive shaft may be connected to a rotor shaft.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
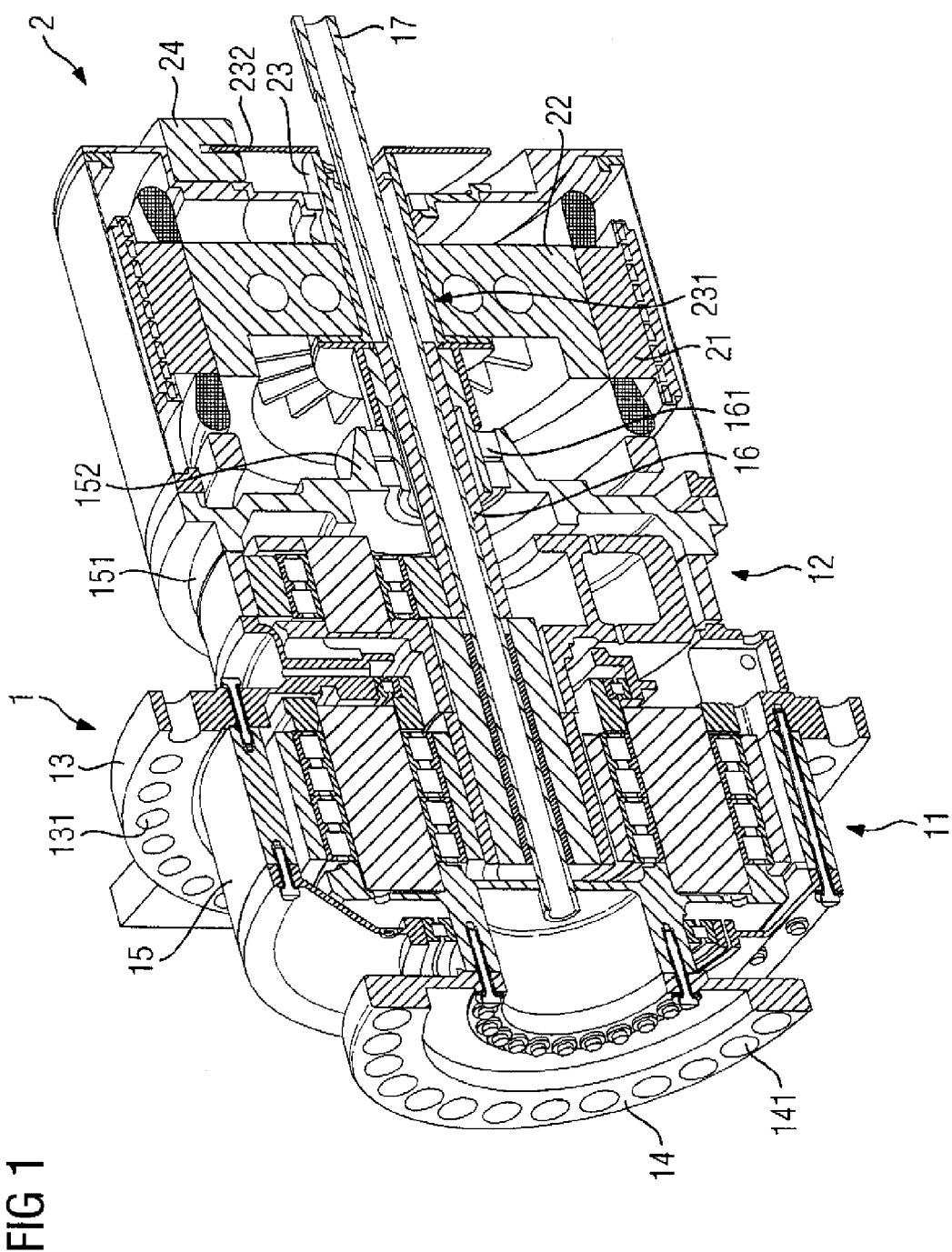
FIG. 1 shows a perspective sectional view of a drive system for a wind turbine according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a drive system for a wind turbine with a gear unit 1 having a first 11 and second planetary gear stage 12 of coaxial design. As can also be seen from the sectional view in FIG. 2, each planetary gear stage 11, 12 has a ring gear 114, 124, a plurality of planetary gears 113, 123, a planetary gear carrier 112, 122 and a sun gear 111, 121. The gear unit 1 is connected to a generator unit 2 via a driven shaft 16 of the gear unit and is disposed together therewith in a gearbox housing unit 15. Associated with the gear unit 1 is a drive shaft integrally molded to the planetary gear carrier 112 of the first planetary gear stage 11 and having a coupling flange 14 which can be connected to a rotor shaft, said drive shaft being supported via the planetary gear carrier 112 of the first planetary gear stage 11. Associated with the planetary gear carrier 112 of the first planetary gear stage 11 are two bearings 115 and 116 disposed between planetary gear carrier jaws and gearbox housing 15 and constituting a first and a second main bearing of the gear unit 1. Correspondingly, the planetary gear carrier 122 of the second planetary gear stage 12 is supported by two bearings 125 and 126 disposed between planetary gear carrier jaws and gearbox housing 15.

The generator unit 2 includes a stator 21 and a rotor 22 which is non-rotatably connected to a hollow rotor shaft 23. The hollow rotor shaft 23 concentrically encloses a generator-side end section of the driven shaft 16 and is connected thereto via a coupling or clamping connection 232 disposed inside the hollow rotor shaft 23. The hollow rotor shaft 23 is spaced axially apart from the driven shaft 16 of the gear unit 1 or is axially connected thereto. Disposed between the hollow rotor shaft 23 and the driven shaft 16 of the gear unit 1 is an electrically isolating, detachable flange connection 231, the gear-side end of which is connected to a hollow gear shaft 162. A generator-side end section of the driven shaft 16 of the gear unit 1 is concentrically enclosed by the hollow gear shaft 162 and connected thereto via a coupling or clamping connection 163 disposed inside the hollow gear shaft 162. A gearbox stub 152 is disposed between gear unit 1 and generator unit 2. Said housing stub 152 concentrically encloses a gear-side end section of the hollow gear shaft 162 and constitutes a bearing seat for a bearing arrangement 161 associated with the driven shaft 16 of the gear unit 1. The driven shaft 16 is also supported by means of this bearing arrangement 161. Disposed inside the driven shaft 16 and the hollow rotor shaft 23 in this exemplary embodiment is a pitch tube 17 which extends axially via the entire drive system.

Figure 2:
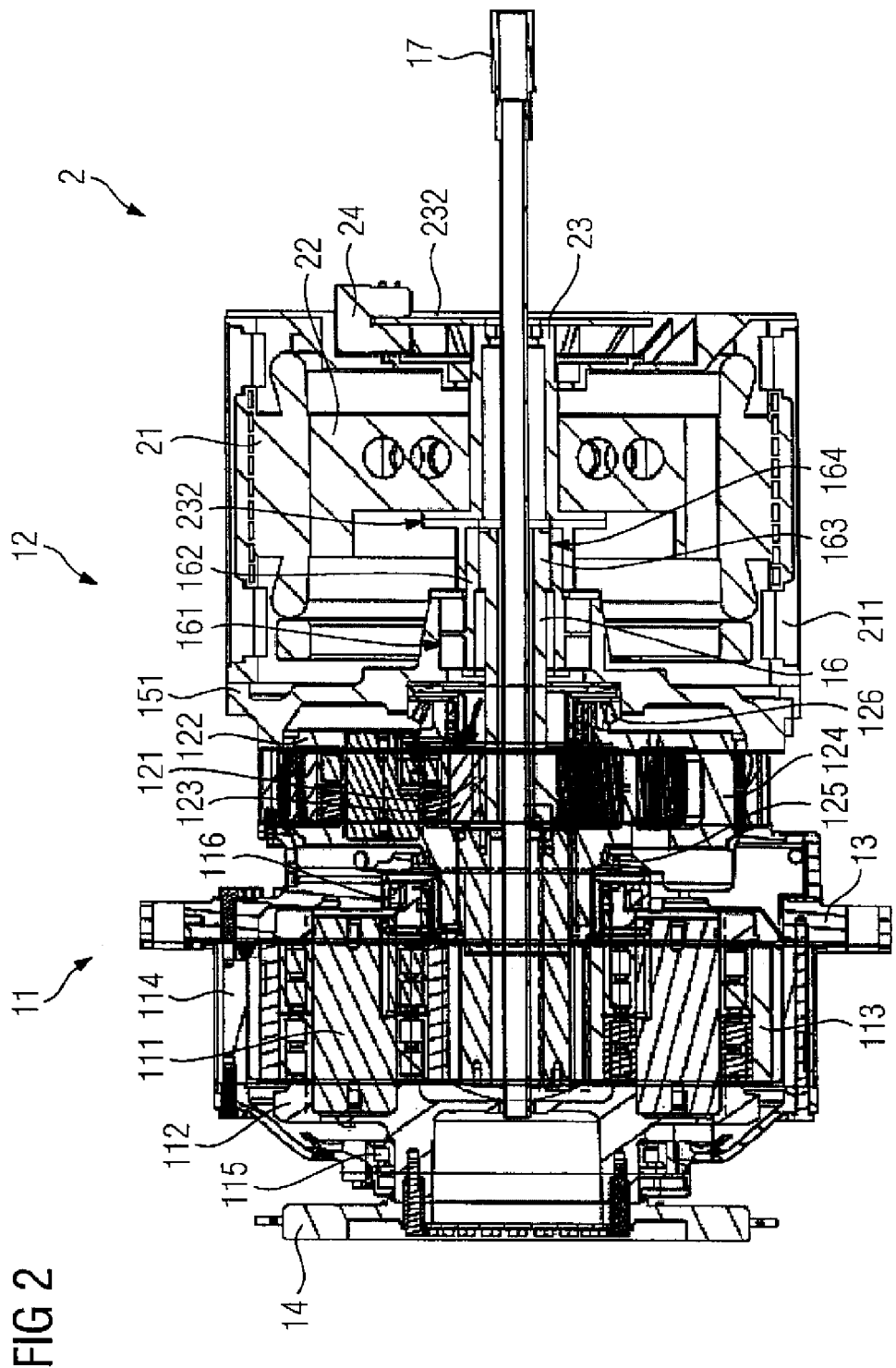
FIG. 2 shows a sectional view of the drive system as illustrated in FIG. 1 with gear unit and generator unit.

According to the sectional view shown in FIG. 2, a rotor-side end of the flange connection 231 is integrally molded to the hollow rotor shaft 23. Mounted on a gear-side end of the hollow gear shaft 162 is a socket flange 164 detachably connected to the rotor-side end of the flange connection 231. In addition, the driven shaft 16 of the gear unit 1 is essentially half-enclosed axially by the hollow generator shaft 162, the bearing arrangement 161 disposed on the gearbox stub 152 being axially aligned approximately centrally to the driven shaft 16 of the gear unit 1, which shaft is connected to the sun gear 121 of the second planetary gear stage 12.

The bearing arrangement 161 of the driven shaft 16 on the housing stub 152 preferably includes a double-row bearing in an X-arrangement. In addition, the hollow rotor shaft 23 and the driven shaft 16 of the gear unit 1 according to a particularly preferred embodiment are supported on the housing stub 152 solely by means of the bearing arrangement 161. A rear hollow rotor shaft bearing 234 as shown in FIG. 2 on an end of the generator unit 2 facing away from the gear unit 1 is therefore not absolutely necessary and can basically be dispensed with.

In this exemplary embodiment, on the hollow rotor shaft 23, a brake disk 233 is non-rotatably mounted on the end of the generator unit 2 facing away from the gear unit 1. The brake disk 233 is therefore easily accessible for maintenance purposes. A brake caliper 24 associated with the brake disk 233 is disposed on the housing cover 153 facing away from the gear unit 1.

The hollow gear shaft 162 can be connected to the driven shaft 16 of the gear unit 1 through a geared coupling 163 with short or curved toothing. Alternatively for this purpose the hollow gear shaft 162 can also be connected to the driven shaft 16 of the gear unit 1 by an inner clamping set. Said inner clamping set includes at least one outer ring and one inner ring which have mutually corresponding conical contact surfaces and are tensioned against one another using a plurality of axially extending clamping bolts. By tensioning the at least one outer ring and the at least one inner ring, according to a preferred embodiment both the driven shaft 16 of the gear unit 1 and the hollow gear shaft 162, and the hollow gear shaft 162 and the socket flange 164, can be interconnected, e.g. in a force-fit manner. The hollow gear shaft 162 can, for example, be widened by tensioning the outer and inner ring. This then results in a force-fit connection between the hollow gear shaft 162 and socket flange 164. The socket flange 164 can also be connected to the hollow gear shaft 162 by means of a keyed joint, for example, which is aligned axially to the inner clamping set.

As an alternative to a geared coupling or an inner clamping set, the hollow gear shaft 162 can be connected to the driven shaft 16 of the gear unit 1 by an outer clamping set. In this case a rotor-side end of the flange connection 231 is, for example, bolted to a flange of the outer clamping set and connected via same to the hollow gear shaft 162. When using an outer clamping set, a flange is advantageously provided on the generator-side end section of the driven shaft 16 of the gear unit 1.

In this exemplary embodiment, the housing stub 152 concentrically enclosing the bearing arrangement 161 of the driven shaft 23 is integrally molded to an intermediate housing flange 151 disposed between gear unit 1 and generator unit 2. Mounted on the intermediate housing flange 151 is both a stator casing 211 of the generator unit 2 and the ring gear 124 of the second planetary gear stage 12. In addition, the intermediate housing flange 151 has a bearing seat for a generator-side planetary gear carrier bearing 126 of the second planetary gear stage 12.

Figure 3:
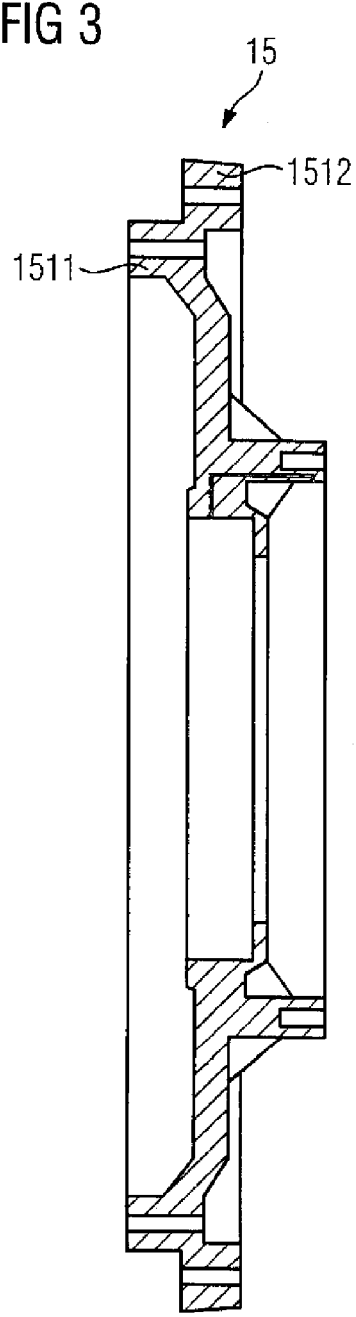
FIG. 3 shows a sectional view of a first variant of an intermediate housing flange between gear unit and generator unit.
Figure 4:
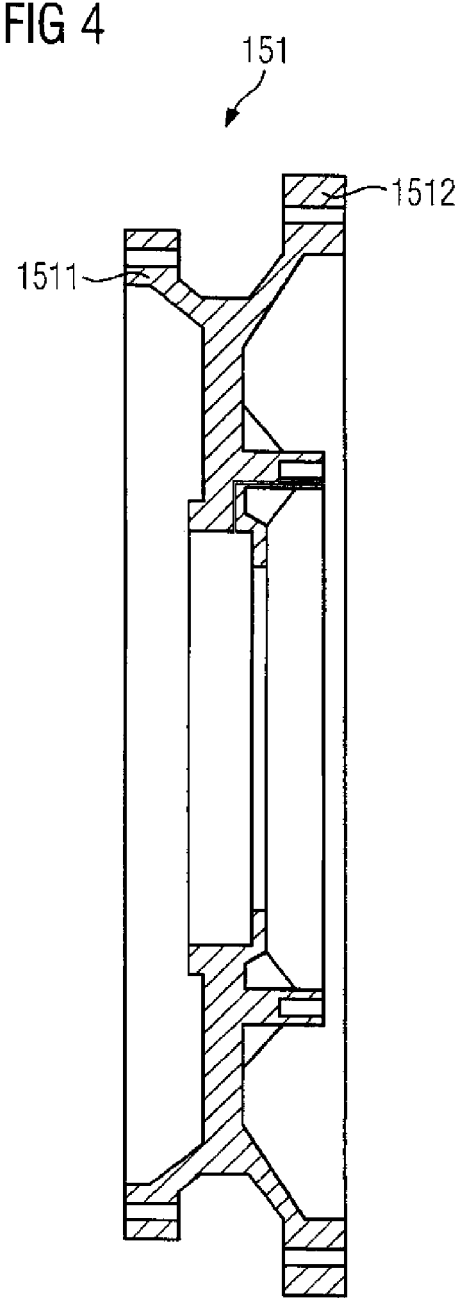
FIG. 4 shows a sectional view of a second variant of an intermediate housing flange between gear unit and generator unit, FIG. 5 schematically illustrates a drive system for a wind turbine including grid connection.

As shown in FIG. 3, the intermediate housing flange 151 has respective flange extensions 1511, 1512 for mounting the stator casing 211 and ring gear 124 of the second planetary gear stage 12. FIG. 4 shows a variant of an intermediate housing flange 151 in which the flange extension 1512 associated with the stator casing 211 and the flange extension 1511 associated with the ring gear 124 are spaced axially apart from one another.

The gearbox housing 15 has a full cardanic, circumferentially symmetrical or partly symmetrical suspension 13 for connection to a structural support element of the wind turbine. Said structural support element is, for example, a frame or nacelle of the wind turbine.

In respect of its transmission ratio, the second planetary gear stage 12 is dimensioned such that essentially identical external diameters of the stator of the generator unit 2 and the ring gear 124 of the second planetary gear stage 12 are produced if a generator pole number divisible by 3 is selected and an optimum design for rated speed is adopted. Generator-side bearings of the gear unit 1 are of electrically isolating design, thereby enabling current to be prevented from flowing from the gear unit 1 to a rotor of the generator unit 2.

The fully cardanic suspension of the drive system in combination with an absence of transverse and radial forces and two-point or slewing ring support of the drive system produces a drive train which is only subject to torsion. By joining the gear unit 1 and generator unit 2 together on the housing side using their high degree of rigidity, at least a significant reduction of constraining forces in the drive train can be achieved despite much less rigid support elements in the cardanic suspension.

By combining the two-point or slewing ring support of the drive system with the fully cardanic suspension of the gearbox housing 15 also incorporating the generator unit 2, a coupling disposed between gear unit 1 and generator unit 2 is subject to significantly less load. Said coupling can therefore be of much more rigid design. This in turn provides further advantages in respect of operating dynamics.

In addition, the main bearing of the gear unit 1 can be embodied without taking supports of downstream components into consideration. This makes it possible to use slewing ring bearings, which only require a much reduced mounting space, for the main bearings of the gear unit 1 in a technically controllable form for large-scale drives. In addition, the fully cardanic suspension for the gear unit 1 has inventively made torsion-induced shaft misalignment irrelevant in terms of damage.

Figure 5:
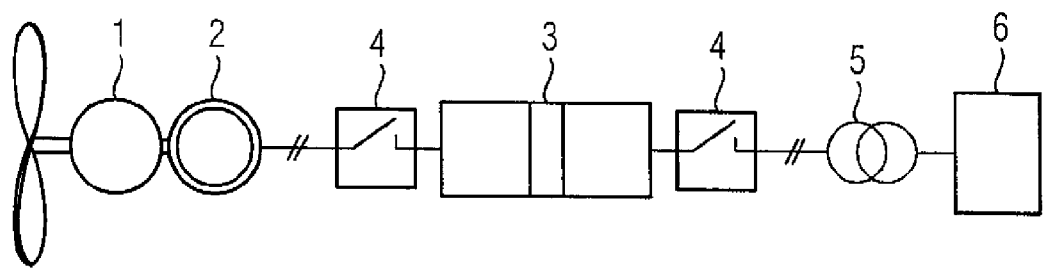

In this exemplary embodiment, the generator unit 2 has independent winding systems which are connected to a full-scale converter 3 shown in FIG. 5. The full-scale converter 3 allows grid-dynamic decoupling and is connected via a switch-disconnector 4 to the generator unit 2 on the one hand and to a transformer 5 on the other for feeding power into a power grid 6. Isolated generator windings are additionally provided for each pole. in addition, the 3 independent winding systems are interconnected outside the gearbox housing 15 enclosing the generator unit 2. The generator unit is of 9- to 30-pole design, preferably 12- to 24-pole.

Figure 6:
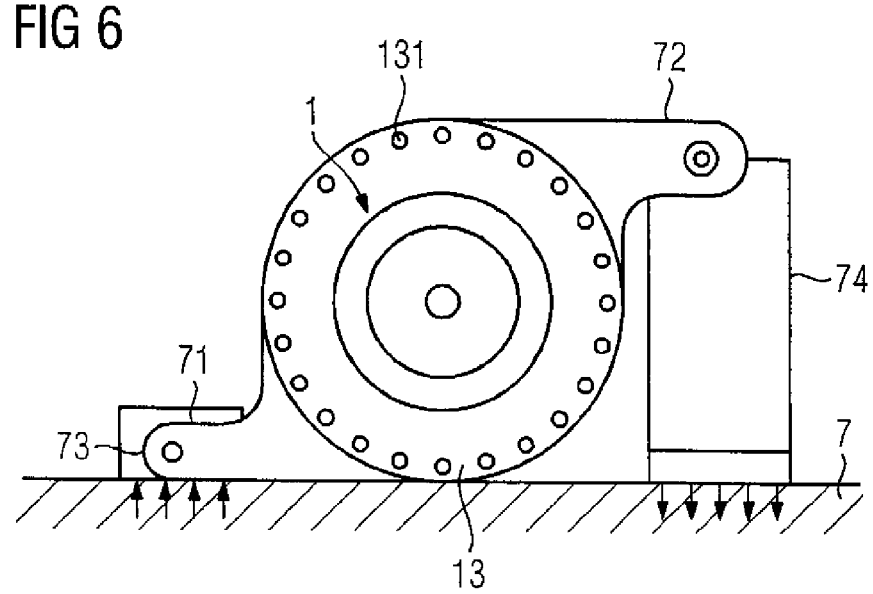
FIG. 6 shows an annular support for a full cardanic suspension of the drive system according to FIG. 1 with a corresponding two-arm torque support.

According to the exemplary embodiment shown in FIG. 6, the fully cardanic suspension 13 is constituted by an annular support radially enclosing the gearbox housing 15 in a fully circumferential manner. The annular support 13 has, in the circumferential direction, a plurality of essentially equidistantly disposed bores 131 into which flexible bolts are inserted with a first end section in each case. The flexible bolts are each connected to a corresponding torque support on the structural support element 7 of the wind turbine. The corresponding torque support likewise includes an annular element having bores disposed essentially equidistantly in the circumferential direction, into which the flexible bolts are inserted with a second end section. In addition, according to the exemplary embodiment shown in FIG. 6, the corresponding torque support has two asymmetrically formed support arms 71, 72 which are each inserted with an end section into a receptacle 73, 74 on the structural support element 7 where they are connected to the latter.

The flexible bolts of the fully cardanic suspension 13 are axially demountable elastomer bolts. The coupling flange 14 also has, as shown in FIG. 1, a plurality of bores 141 disposed essentially equidistantly in the circumferential direction into which are inserted the axially demountable elastomer bolts which are connected to a corresponding rotor shaft coupling flange. Demounting the elastomer bolts of the fully cardanic suspension 13 and coupling flange 14 clears a radial removal or installation direction of the drive system with respect to a shaft arrangement of the gear unit 1.

Ancillary equipment of the gear unit 1, e.g. oil supply system, cooler and hydraulics, are advantageously mounted directly on the structural support element 7 of the wind turbine. The ancillary equipment is therefore decoupled from the gearbox housing 15 via the fully cardanic suspension 13 and a flexible coupling between rotor shaft and drive shaft of the gear unit 1.

Figure 7:
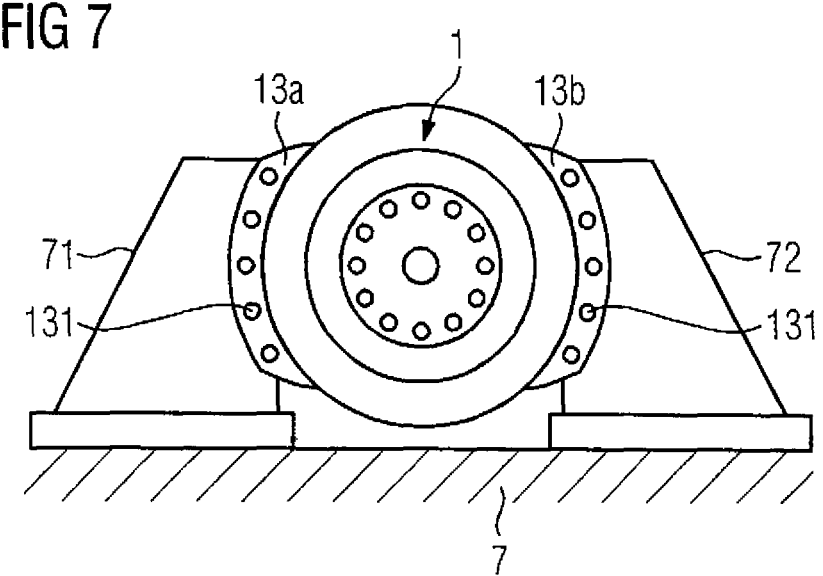
FIG. 7 shows two annular segment supports for the full cardanic suspension of the drive system according to FIG. 1 with corresponding torque supports.
Figure 8:
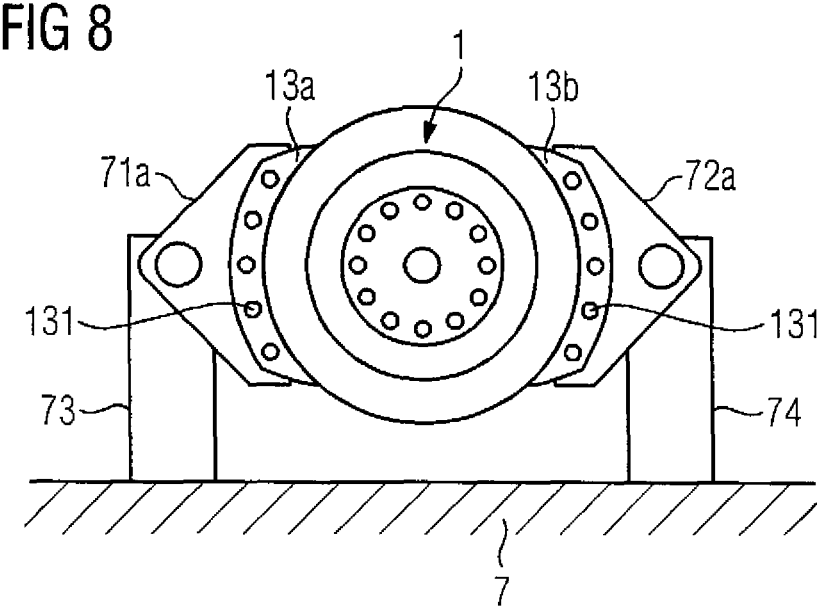
FIG. 8 shows two annular segment supports in a variant of FIG. 7.

FIGS. 7 and 8 show two ring segment supports 13a, 13b for the partially circumferential fully cardanic suspension of the drive system. The ring segment supports 13a, 13b each have a plurality of bores 131 disposed essentially equidistantly in the circumferential direction, in which flexible bolts are inserted. In addition, the flexible bolts are connected to corresponding torque supports 71, 72 on the structural support element 7 of the wind turbine. According to the exemplary embodiment shown in FIG. 7, the corresponding torque supports 71, 72 are fixed directly to the structural support element 7 of the wind turbine. On the other hand, according to the exemplary embodiment shown in FIG. 8, the corresponding torque supports each include a support arm 71a, 72a which is inserted with one end section in a receptacle 73, 74 on the structural support element where it is connected thereto. An installation capability like a conventional two-arm support is therefore maintained without it being necessary to adapt the main frame of the wind turbine. As there is already an absence of constraining forces, known elastomer supports can be used which are preferably fully compliant with vibration damping criteria.

Both in the case of the exemplary embodiment shown in FIG. 7 and in the case of the exemplary embodiment shown in FIG. 8, the corresponding torque supports on the structural support element 7 each have an annular segment with bores 131 disposed essentially equidistantly in the circumferential direction. Into these bores 131 are inserted the flexible bolts which, as in the exemplary embodiment shown in FIG. 6, can likewise be implemented as axially demountable elastomer bolts. The axis of symmetry of the torque supports and the axis of rotation of the drive system preferably intersect one another.

In addition, according to another embodiment, the coupling flange can have a plurality of mutually offset rows of bores into which axially demountable elastomer bolts are inserted. This enables the coupling flange to be of smaller design in respect of its external diameter with the bore spacings remaining the same.

Moreover, the elastomer bolts can have different rigidities matched to the diameter and type of flange. In particular, the coupling flange with a smaller diameter than the suspension can be made of harder material, while the suspension can be made of softer material.

The use of the drive system described is not limited to wind turbines, but can also conceivably be used e.g. in mill drive systems in which the generator unit is replaced by a motor unit.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A drive system for a wind turbine, including:
   a gear unit including at least one planetary gear stage having a ring gear, a plurality of planetary gears, a planetary gear carrier and a sun gear,
   a first shaft associated with the gear unit and supported via the planetary gear carrier, the first shaft having a coupling flange configured for connection to a shaft of a working machine or a rotor,
   a gearbox housing enclosing the gear unit and a motor unit or a generator unit connected to a second shaft of the gear unit,
   a rotor of the motor unit or generator unit, wherein the rotor is non-rotatably connected to a hollow rotor shaft which is axially spaced apart from the second shaft of the gear unit,
   an electrically isolating, detachable flange connection disposed between the hollow rotor shaft and the second shaft of the gear unit, with a gear-side end of the flange connection being connected to a hollow gear shaft,
   a motor-side or generator-side end section of the second shaft of the gear unit being concentrically enclosed by the hollow gear shaft and connected to the hollow gear shaft via a coupling or clamping connection disposed inside the hollow gear shaft, and
   a gearbox stub disposed between the gear unit and the motor unit or generator unit and concentrically enclosing a gear-side end section of the hollow gear shaft and forming a bearing seat for a bearing arrangement associated with the second shaft of the gear unit, with the bearing arrangement also supporting the hollow rotor shaft.

2. The drive system of claim 1, wherein a rotor-side end of the flange connection is integrally formed on the hollow rotor shaft.

3. The drive system of claim 1, further including a socket flange mounted on a motor- or gear-side end of the hollow gear shaft and detachably connected to the rotor-side end of the flange connection.

4. The drive system of claim 1, further including a geared coupling with short or curved toothing the hollow gear shaft to the second shaft of the gear unit.

5. The drive system of claim 1, further including an inner clamping set connecting the hollow gear shaft to the second shaft of the gear unit.

6. The drive system of claim 5, wherein the inner clamping set includes at least one outer ring and one inner ring which have mutually corresponding conical contact surfaces and can be tensioned against one another by a plurality of axially extending clamping bolts.

7. The drive system of claim 6, further including a socket flange disposed on a motor- or gear-side end of the hollow gear shaft and detachably connected to a rotor-side end of the flange connection, wherein the second shaft of the gear unit and the hollow gear shaft, as well as the hollow gear shaft and the socket flange, can be interconnected by tensioning the at least one outer ring and the at least one inner ring.

8. The drive system of claim 6, wherein a socket flange is connected to the hollow gear shaft by a keyway which is axially oriented toward the inner clamping set.

9. The drive system of claim 7, wherein the second shaft of the gear unit and the hollow gear shaft, as well as the hollow gear shaft and the socket flange, can be interconnected with a friction lock by tensioning the at least one outer ring and the at least one inner ring.

10. The drive system of claim 1, further including a flange disposed on a motor-side or generator-side end section of the second shaft of the gear unit, and an outer clamping set connecting the hollow gear shaft to the second shaft of the gear unit, wherein the outer clamping set includes an additional flange connected to a rotor-side end of the flange connection.

11. The drive system of claim 1, wherein substantially half of the second shaft of the gear unit is axially enclosed by the hollow generator shaft.

12. The drive system of claim 1, wherein the bearing arrangement disposed on the gearbox stub is axially aligned centrally to the second shaft of the gear unit which is connected to the sun gear.

13. The drive system of claim 1, wherein the bearing arrangement disposed on the gearbox stub includes a double-row bearing in an X-configuration.

14. The drive system of claim 1, wherein the hollow rotor shaft and the second shaft of the gear unit are supported solely by the bearing arrangement on the gearbox stub.

15. The drive system of claim 1, wherein the gearbox stub is integrally formed on an intermediate housing flange disposed between the gear unit and the motor or generator unit.

16. The drive system of claim 15, wherein the intermediate housing flange includes a bearing seat for a motor-side or generator-side planetary gear carrier bearing.

17. The drive system of claim 15, wherein a stator casing of the motor unit or generator unit is mounted on the intermediate housing flange.

18. The drive system of claim 15, wherein a ring gear of a motor-side or generator-planetary gear stage is mounted on the intermediate housing flange.

19. The drive system of claim 15, wherein the intermediate housing flange includes flange extensions, with a stator casing of the motor unit or generator unit or a ring gear of a motor-side or generator-side planetary gear stage being mounted on the flange extensions.

20. The drive system of claim 19, wherein a flange extension associated with the stator casing and a flange extension associated with the ring gear are axially spaced apart from each other.

21. The drive system of claim 1, wherein the first shaft of the gear unit includes a coupling flange flexibly connected to the shaft of a working machine or a rotor, and wherein the gearbox housing includes a circumferentially symmetrical or partially symmetrical cardanic suspension for connection to a structural support element of the wind turbine.

22. The drive system of claim 21, wherein the cardanic suspension is formed by an annular support radially enclosing the gearbox housing in a fully circumferential manner and having in the circumferential direction a plurality of essentially equidistantly disposed through-holes in which the flexible bolts, which can be connected to corresponding torque supports on the structural support element of the wind turbine, are inserted.

23. The drive system of claim 22, wherein the corresponding torque supports each include an annular element with through-holes disposed essentially equidistantly in the circumferential direction and configured for insertion of the flexible bolts.

24. The drive system of claim 23, wherein the corresponding torque supports include two symmetrically or asymmetrically integrally formed support arms which can each be inserted with an end section into and connected to a receptacle on the structural support element.

25. The drive system of claim 24, wherein the cardanic suspension is formed from two annular segment supports radially enclosing the gearbox housing in a partially circumferential manner and each having a plurality of through-holes disposed essentially equidistantly in the circumferential direction into which the flexible bolts, which can be connected to corresponding torque supports on the structural support element of the wind turbine, are inserted.

26. The drive system of claim 25, wherein the corresponding torque supports each include an annular segment with through-holes disposed essentially equidistantly in the circumferential direction into which through-holes the flexible bolts can be inserted.

27. The drive system of claim 26, wherein the corresponding torque supports each include a support arm which can be inserted with an end section into and connected to a receptacle on the structural support element.

28. The drive system of claim 22, wherein the flexible bolts of the cardanic suspension are axially removable elastomer bolts, and wherein the coupling flange has, in the circumferential direction, a plurality of essentially equidistantly disposed through-holes into which axially removable elastomer bolts, which can be connected to a corresponding working machine or rotor shaft coupling flange, are inserted.

29. The drive system of claim 28, wherein a radial removal and/or installation direction of the drive system in respect of a shaft arrangement of the gear unit is left unobstructed, when the elastomer bolts of the cardanic suspension and of the coupling flange are removed.

30. The drive system of claim 21, further including ancillary equipment of the gear unit being mounted directly on the structural support element of the wind turbine and decoupled from the gearbox via the cardanic suspension and a flexible coupling between working machine or rotor shaft and the first shaft of the gear unit.

31. The drive system of claim 21, wherein the gear unit includes a first main bearing and a second main bearing disposed between planetary gear carrier jaws and gearbox housing and supporting the first shaft of the gear unit.

32. The drive system of claim 21, wherein the gear unit includes a first planetary gear stage and a second planetary gear stage which are arranged in a coaxial configuration.

33. The drive system of claim 1, wherein a brake disk is connected to the hollow rotor shaft with a rotation lock.

34. The drive system of claim 33, wherein the brake disk is disposed on an end of the motor or generator unit facing away from the gear unit.

35. The drive system of claim 1, wherein motor-side or generator-side bearings of the gear unit are of an electrically isolating design.

36. The drive system of claim 1, wherein the gear unit is connected to a generator unit, and wherein the first shaft of the gear unit is a gear-side drive shaft, and wherein the second shaft of the generator unit is a gear-side driven shaft, and wherein the coupling flange of the gear-side drive shaft can be connected to the rotor shaft.

* * * * *